United States Patent Office 3,840,643
Patented Oct. 8, 1974

3,840,643
FLUE GAS DESULFURIZATION USING SORBENT HAVING GRADIENT CONCENTRATION OF ACTIVE MATERIAL
Homer Z. Martin, Westfield, N.J., assignor to Esso Research and Engineering Company, Linden, N.J.
Filed Nov. 1, 1971, Ser. No. 194,357
Int. Cl. B01b 9/04, 9/08, 9/12, 9/16, 9/20; C01b 17/00
U.S. Cl. 423—244                                              8 Claims

ABSTRACT OF THE DISCLOSURE

Sulfur dioxide is removed from flue gas by passing the flue gas through a fixed bed of a sorbent comprising a porous support impregnated with a metal or metal oxide which is a selective sorbent for $SO_2$. The sorbent has a gradient concentration of said metal or metal oxide, the concentration being greatest at the inlet end. Copper oxide on alumina is a preferred composition.

---

This invention relates to processes for removal of sulfur dioxide from gases containing the same, and more particularly to flue gas desulfurization processes.

Sulfur dioxide is a constituent of various waste gases. Among these are flue gases formed by the combustion of fossil fuels, off gases from various chemical and petroleum refining processes, and smelter gases. A major source of sulfur dioxide pollution of the atmosphere is flue gas from electric power plants. Such flue gas typically contains about 0.2 to 0.3% by volume of sulfur dioxide, trace amounts of sulfur trioxide, and some oxygen (i.e., about 1 to 4% by volume) due to the use of excess air in combustion. Sulfur dioxide is irritating to the respiratory system, is toxic to plant life, and is corrosive to metals. Hence it is imperative that discharge of sulfur dioxide into the atmosphere be held to a low level.

Various processes have been suggested for the removal of sulfur dioxide from gases. These may be classified generally into wet and dry processes. The present invention is concerned with the latter. Dry processes generally employ a solid sorbent composition comprising an active material for the selective removal of $SO_2$ from gases on a porous support or carrier. The active material is generally a metal or metal oxide, such as copper or copper oxide, and the porous support is generally an essentially inert material such as alumina, silica, silica-alumina, and the like. Dry processes for flue gas desulfurization using solid sorbents are disclosed, for example, in U.S. Pats. 3,411,865 and 3,501,897, and in British. Pat. 1,089,716. Copper oxide on alumina, which is the sorbent composition disclosed in British Pat. 1,089,716, is a preferred flue gas desulfurization sorbent. Desulfurization is accomplished by passing flue gas containing sulfur dioxide through a bed of the sorbent until the effluent $SO_2$ concentration reaches a predetermined level, then regenerating the sorbent with a reducing gas.

The active material of the sorbent ordinarily is not completely utilized. That is, when the sulfur dioxide content in the effluent flue gas reaches the predetermined level, there is still unconverted metal oxide in the sorbent. The present invention provides a flue gas desulfurization process in which improved utilization of the active ingredient is achieved.

SUMMARY OF THE INVENTION

According to this invention, a flue gas containing sulfur dioxide is contacted with a fixed bed of a solid sorbent comprising an active material for the removal of sulfur dioxide on a porous support, the sorbent composition having a concentration gradient of active material diminishing from the inlet end of the bed to the exit end.

DRAWINGS

Figure 1:
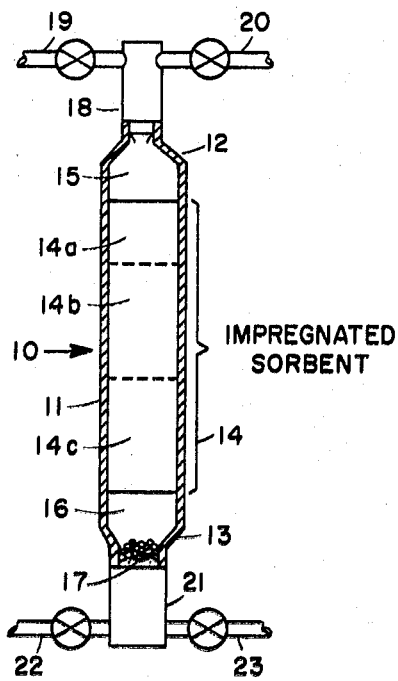
Figure 2:
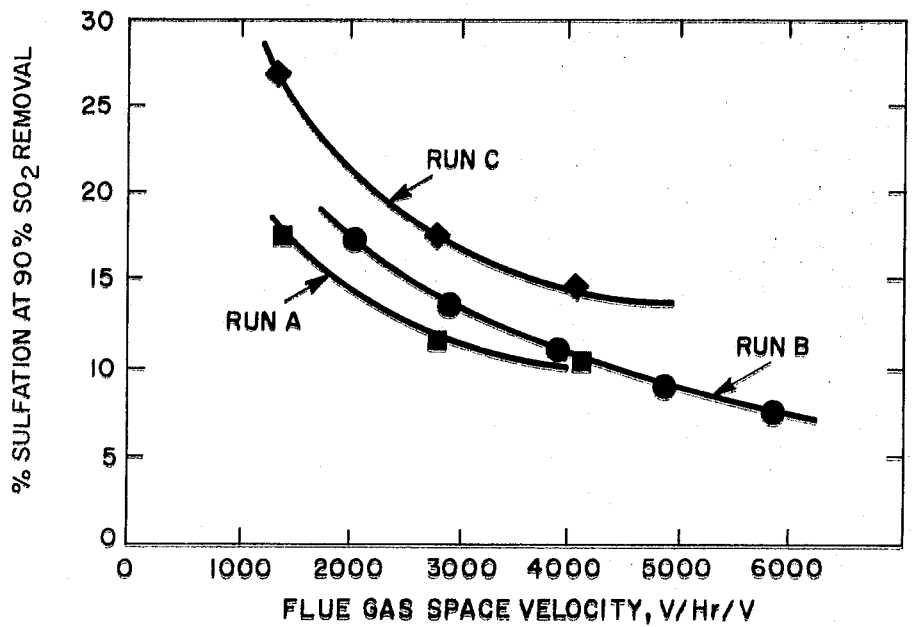

In the drawings:
FIG. 1 is a vertical section view of a reactor packed with a sorbent according to this invention.
FIG. 2 is a graph showing percentage sulfation vs. space velocity using both a sorbent of this invention and comparison sorbents.

DESCRIPTION OF THE PREFERRED EMBODIMENT

According to a preferred embodiment of this invention, flue gas is passed downwardly through a fixed bed of solid sorbent having a gradient concentration of active material on a porous support in a vertical tubular reactor. Copper oxide is a preferred active material. The concentration of active material may diminish either gradually or stepwise from the inlet end to the exit end of the bed, but the latter is preferred for ease of sorbent preparation and sorbent bed assembly. When the amount of sulfur dioxide in the effluent flue gas rises to a predetermined maximum, the flow of flue gas is stopped and the sorbent is regenerated by passing a reducing gas through the bed in either the same direction as or in the opposite direction to the direction of flue gas flow.

Utilization of active material in the removal of sulfur dioxide from flue gas is greatly enhanced by providing a fixed bed of sorbent having a gradient concentration of active material according to the present invention, rather than a uniform concentration throughout the bed. This invention is generally applicable to flue gas desulfurization processes utilizing a solid sorbent comprising an active material supported on a porous support. Also, more effective utilization of the reducing gas on regeneration is achieved.

Referring now to FIG. 1, 10 is a vertical tubular reactor of suitable material such as stainless steel or other alloy steel. Reactor 10 comprises a tube 11, and a pair of funnel shaped end sections 12 and 13 which include frustoconical cylindrical pipe connection portions of smaller diameter than tube 11. The reactor 10 is packed with a fixed bed 14 of impregnated sorbent, with two sections 15 and 16 of substantially inert unimpregnated packing material at the ends. These two sections 15 and 16 of inert material can be omitted. The packing is supported on screen 17 at the bottom of the reactor.

The sorbent bed 14 has three sections 14a, 14b and 14c from top to bottom, each (except the top section 14a) having a lower concentration of active material than the section above it. The active material concentration within each section 14a, 14b and 14c is substantially uniform. In this way a gradient concentration of active material is provided in sorbent bed 14. The preferred sorbent material in bed 14 is copper on alumina in the form of particles of any desired shape, but preferably having the shape illustrated in U.S. Pats. 2,639,909 and 3,060,503.

The upper end of reactor 10 is connected to a first header 18, which in turn is connected to a flue gas supply pipe 19 and a regeneration gas supply pipe 20. The lower end of reactor 10 is connected to a second header 21 which in turn is connected to a flue gas exit pipe 22 and a regeneration off gas piper 23. (Where countercurrent regeneration is desired, 23 becomes the regeneration gas supply pipe and 20 the regeneration off gas pipe.)

The operating cycle comprises a sulfation step followed by a regeneration step. During sulfation, flue gas containing sulfur dioxide and oxygen is admitted through pipe 19 and header 18, and passes downwardly through sorbent bed 14. Flue gas of greatly reduced sulfur dioxide content passes out through pipe 22. The valves in pipes 20 and 23 are closed during the step. During regeneration, a reducing gas such as hydrogen or a gas mixture containing hydrogen and steam is admitted through pipe 20 and is passed downwardly through sorbent bed 14, and off gas pipe 23. The regeneration off gas in pipe 23 is considerably richer in sulfur dioxide than the entering flue gas in pipe 19. The $SO_2$ content of the off gas can be converted by known means to sulfur or sulfuric acid. A flue gas desulfurization system preferably has a plurality of reactors 10 in parallel so that at least one reactor 10 is on stream to receive flue gas at all times.

The concentration of active copper at the inlet end may be in the range of about 3% to about 15% by weight of the sorbent at the inlet end (i.e., in bed section 14a), about 2% to about 7% in the middle of the bed (i.e., bed section 14b), and about 1% to about 5% at the exit end (i.e., the bed section 14c). The overall copper concentration may range from about 2% to about 9% by weight copper (as Cu).

A preferred sorbent for use in this invention may have an average overall concentration of about 3% to about 5% by weight of copper. The concentration of copper is typically from about 4% to about 8% by weight in bed section 14a nearest the inlet end, about 3% to about 5% by weight in middle bed section 14b, and from about 1% to about 3% by weight in bed section 14c nearest the exit end. Preferred active material concentrations may vary when using active material other than copper oxide. It is seen, therefore, that the concentration of the active materials is greater by at least 2% by weight at the inlet end than the concentration of the active materials at the exit end.

Copper or copper oxide is the preferred active material for sorbent compositions of this invention, as previously noted, but other metals and metal oxides which are known in the art, such as a combination of potassium oxide and vanadium pentoxide can be used. Generally, the active material is a heavy metal or oxide thereof. The term "active material" as used in this specification includes any metal or metal oxide which is capable of selective removal of sulfur dioxide from gas mixtures and which can be regenerated.

Alumina of high surface area (at least about 100 m.$^2$/gm.) is a preferred support or carrier material for the sorbents of this invention and particularly for copper oxide. Other porous, essentially inert support material which can be used include silica-alumina and silica. Magnesia, chromia, zirconia and zirconia-kieselguhr mixtures are also usable. Various commercial sorbent grades of alumina, e.g., hydrated gamma alumina or eta alumina, having a high surface area, high pore volume, and low bulk density are acceptable.

The alumina is formed into a desired shape, such as cylindrical extrudates, spherical pellets, Raschig rings, or saddles. Shapes such as Raschig rings and saddles are preferred because packed beds of particles in these shapes have a high void volume. Saddles having the shape illustrated in U.S. Pats. 2,369,909 and 3,060,503 are a preferred shape for sorbents of this invention. A packed bed of such saddles has a typical void volume of about 65% to 70%. High void volume is desirable because this minimizes the pressure drop of flue gas as it passes through the sorbent bed. The pressure of flue gas as it leaves the boiler in an electric power plant is typically only about 4 to 10 inches of water above atmospheric pressure. Shapes such as Raschig rings and saddles can be prepared by forming an extrudable alumina mix, extruding the mix into particles of desired shape, drying and calcining. The techniques and apparatus described in U.S. Pat. 3,060,503 can be used for forming saddles. Conventional shapes such as spheres and cylindrical extrudates can be formed by conventional means.

Sorbents for the present invention can be impregnated by conventional techniques, e.g., impregnation of the calcined support with an aqueous solution of a salt of the desired metal, such as copper nitrate, followed by drying and calcination to convert the salt to the corresponding oxide. In the preparation of copper on alumina sorbents, the copper nitrate impregnant is converted during calcination to copper oxide.

The sorbents are impregnated in a plurality of lots, each lot being impregnated to a different concentration of active ingredient. The first lot, which is used in the inlet section 14a of the catalyst bed 14, may be impregnated to a concentration of about 4% to about 8% by weight of copper, based on total sorbent weight, by conventional impregnation techniques which cause the copper to be distributed throughout the support. The lower active material concentrations in the remaining lots, which are used for the middle and lower sections 14b and 14c, respectively, can be achieved either by impregnating the carrier throughout using a lower solution concentration or shorter impregnation time, or by impregnating only the surface of the carrier material.

Various means can be used to limit the depth of impregnation. One way is to spray the impregnating solution onto the surface of the carrier material. The depth of penetration and therefore the volume percentage of sorbent impregnated can be varied over wide limits in spraying the carrier material. An advantage of using a surface impregnated sorbent in sections 14b and 14c of bed 14 is that better utilization of copper oxide is achieved since the reaction between sulfur dioxide and copper oxide is diffusion limited.

The impregnated support material is calcined according to conventional procedures, i.e., in an oven at temperatures of about 700° to about 1000° F., in order to decompose the copper nitrate into copper oxide. The copper oxide may be then reduced to metallic copper by means of a reducing gas such as hydrogen or a low molecular weight hydrocarbon such as butane or propane. This reduction may be carried out in the flue gas desulfurization reactor. The sorbent is then ready for use in flue gas desulfurization.

During the sulfation step, a stream of flue gas generally containing about 0.1% to about 0.5% by volume and typically about 0.2 to about 0.3% by volume of sulfur dioxide, and also containing some oxygen (generally about 1 to about 4% by volume) due to the use of excess air in the combustion process in which the flue gas is formed, is contacted with a fixed bed of the sorbent at a temperature of about 600° to about 900° F. and at the desired space velocity, generally in the range of about 1000 to about 5000 v./v./hr. The metallic copper is oxidized quantitatively to copper oxide, which in turn is partially converted to copper sulfate, during the sulfation step. Thus copper oxide is the active material in a sorbent comprising copper and/or copper oxide on a suitable support such as alumina. The exit gas has a much lower $SO_2$ concentration than the incoming flue gas. Initially the $SO_2$ effluent concentration is very low, but as sulfation proceeds, the $SO_2$ concentration in the effluent rises.

When the total amount of sulfur dioxide in the exit gas over a whole sulfation cycle reaches a predetermined level, e.g., 10% of the amount of sulfur dioxide in the entering gas, the flow of flue gas is stopped and the bed is regenerated with a reducing gas such as hydrogen, hydrogen-steam mixtures, carbon monoxide, or low molecular weight hydrocarbon. This reduces the copper sulfate to copper and/or copper oxide, depending on whether a strong reducing agent (e.g., hydrogen) or a milder reducing agent (e.g., CO or a hydrocarbon) is used, with some side reaction, i.e., copper sulfide formation. The regeneration gas can be passed through the bed in either the same direction as the flue gas, or in the opposite direction.

The ability to remove 90% of the incoming $SO_2$ in a waste gas has been suggested as a performance criterion for flue gas desulfurization sorbents. This standard is achieved by stopping all sulfation cycles and regenerating the sorbent when the total amount of $SO_2$ in the effluent over a whole cycle reaches 10% of the amount of $SO_2$ in the influent.

The sulfur dioxide and oxygen concentrations given herein are typical of the concentrations in flue gas from electric power plants. Other waste gas streams containing $SO_2$, often in concentrations substantially greater than 0.5% by volume, can be treated according to this invention. This process is generally applicable to removing $SO_2$ from waste gas streams in which the $SO_2$ content is too low to permit economical direct conversion of $SO_2$ to a desirable byproduct.

This invention will now be described further with reference to specific embodiments thereof as illustrated in the following examples.

EXAMPLE 1

Three sorbents designated 1, 2 and 3 and having different concentrations of copper oxide on alumina were prepared. These sorbents were prepared from a commercially available spray dried alumina powder made by Harshaw Chemical Company, Cleveland, Ohio, and supplied under their designation AL–1700P. As supplied, the alumina powder contained 25.5 weight percent volatile matter. After calcining the alumina had a surface area (B.E.T. method) of 280 m.$^2$/g. and a pore volume of 1.0 cc./g.

Sorbent 1

To prepare Sorbent 1, the alumina powder was peptized with diluted acetic acid and the resulting mix was extruded into saddles ½ inch long having the shape shown and described in U.S. Pat. 2,639,909, using the process and machine described in U.S. Pat. 3,060,503. The saddles were air dried. A 1400-gram batch of air dried saddles was oven dried overnight (weight 1,148 g.) and calcined in air for three hours at 1400° F.; weight 870 g. The calcined saddles were exposed to moisture-containing air for 19 hours; weight 980 g. An aqueous impregnating solution containing 350 g. of copper nitrate,

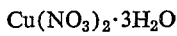

$$Cu(NO_3)_2 \cdot 3H_2O$$

in 500 cc. of solution was prepared. The air exposed saddles were soaked in the copper nitrate solution for 5 minutes, drained on paper, air dried 48 hours, oven dried at 250° F. over a weekend, and calcined for 3 hours at 800° F. Analysis of the calcined material showed 8.6% by weight Cu, a surface area of 187 m./$^2$g., and a pore volume of 0.51 cc./g.

Sorbent 2

Three hundred parts by weight of alumina powder was mixed with 311 parts by weight of 17% (by weight) acetic acid, and the resulting mix was extruded and shaped by hand into ½ inch saddles having the shape shown in U.S. Pat. 2,639,909. The saddles were air dried, oven dried, and calcined in air for 3 hours at 1400° F. Several batches of saddles were made in this manner and composited to give 836 g. of calcined saddles. To impregnate these saddles, an aqueous impregnating solution containing 162 g. of copper nitrate in 208 cc. of solution was made up. The saddles were divided into two portions for impregnation. Each portion was placed in a 2 gallon fiberboard drum set almost horizontally on ball mill rollers and having a hole in the lid for a spray nozzle. The saddles were tumbled slowly by hand while the copper nitrate solution was admitted through the spray nozzle with 10 p.s.i.g. air atomization. The portions were dried separately overnight at 250° F., and calcined in air for 3 hours at 800° F. Analysis of the calcined material showed 3.76 weight percent Cu, a surface area of 202 m.$^2$/g., and a pore volume of 0.54 cc./g. The effect of spraying the solution was to limit the depth of impregnation. About 40% of the total volume of a representative saddle was found to be impregnated. The particle density of these saddles is 1.22 g./cc. or 76 lb./ft.$^3$. A packed bed of 817 g. (1.8 lb.) of these saddles had a volume of 2.13 liters (.0755 ft.$^3$), giving a bed density of 23.9 lb./ft.$^3$. This represents a void volume of 68.6%.

Sorbent 3

Air dried saddles were prepared in the same manner as in Sorbent 1. A 1600-gram batch of air dried saddles was oven dried at 250° F. (weight 1264 g.) and calcined in air for 3 hours at 1400 F.; weight 982 g. An aqueous copper nitrate impregnating solution containing 50.6 g. of copper nitrate in 62.7 cc. of solution was prepared. The saddles were divided into 300-gram batches, each of which was impregnated with 17.1 cc. of the copper nitrate solution. The saddles were tumbled at 15 r.p.m. The impregnating solution was supplied through a spray nozzle; the air atomizer pressure was 12 p.s.i.g. static and 10 p.s.i.g. when the atomizer was in operation. The impregnated saddles were dried and calcinated at 800° F. for 3 hours. Analysis of the calcined material showed 0.95 weight percent Cu, a surface area of 202 m.$^2$/g., and a pore volume of 0.54 cc./g. Only about 10% of the total volume of the saddles was impregnated.

EXAMPLE 2

The effectiveness of sulfur dioxide removal from flue gas in a fixed sorbent bed having a gradient concentration of copper on alumina and in fixed sorbent beds having uniform concentrations of copper on alumina was compared in a series of three runs, using the sorbents prepared in Example 1.

The reactor used in all runs was an externally heated vertical tubular reactor having a 3 inch inside diameter tube 26 inches long and two funnel-shaped end sections, each 3 inches long, for connection to 1½ inch diameter headers, as shown in FIG. 1. In each run, the reactor contained a packed bed 14 of impregnated copper on alumina saddles 18 inches deep with two end sections 15 and 16 of unimpregnated alumina saddles. In comparison Run A, the packed bed 14 consisted of Sorbent 1 saddles, having a uniform copper concentration of 8.6% by weight. In comparison Run B, the packed bed 14 consisted of Sorbent 2 saddles, having a copper concentration of 3.76% by weight. In Run C according to this invention, the packed bed was divided into three sections 14a, 14b and 14c from top to bottom, containing 20%, 40% and 40% by volume, respectively, of the total volume of bed 14. The top section 14a consisted of saddles discharged from Run A, having a copper content of 8.15%. The middle section 14b consisted of saddles discharged from Run B, having a copper content of 3.54%. (It will be noticed that a small amount of copper was lost from the sorbent during Runs A and B.) The lower section, i.e. 14c, consisted of fresh Sorbent 3 saddles prepared as described in Example 1, having a copper content of 0.95 weight percent.

The sorbents in all runs were alternatively sulfated and regenerated by passing synthetic flue gas and a regeneration gas, respectively, through the reactor. The synthetic flue gas contained about 0.1–0.2% by volume of $SO_2$ (as indicated in Table I below), about 2.5–4% by volume of oxygen, and the balance mostly nitrogen. The flue gas was passed downwardly through the reactor at an inlet temperature of about 650° F. and at various space velocities. Flow of flue gas was discontinued when the amount of $SO_2$ in the reactor effluent rose to 10% of the amount of $SO_2$ in the entering flue gas, as measured over the course of a whole sulfation cycle. Regeneration was carried out by passing a mixture of 60% by volume of steam and 40% by volume of hydrogen downwardly through the reactor. Some operating cycles also included a purge with steam and/or nitrogen.

Table I below shows the percentage sulfation of the copper oxide in the sorbent (i.e., gram atoms of S per gram atom of Cu in the sorbent) at 90% removal of $SO_2$ from the incoming gas. These results are shown graphically in FIG. 2.

TABLE I

| | Run A | Run B | Run C |
|---|---|---|---|
| Cu concentration, percent by weight | [1] 8.15 | [1] 3.54 | [2] 3.43 |
| $SO_2$ inlet concentration, p.p.m. | 2,000 | 1,000–1,100 | 2,000 |
| Percent sulfation at indicated space velocity, v./v./hr.: | | | |
| 1,340 | 18.1(5) | | |
| 1,350 | | | 26.8(2) |
| 2,050 | | 17.5(1) | |
| 2,700 | | 11.7(14) | 17.6(5) |
| 3,860 | | | 10.3(3) |
| 4,040 | 10.3(2) | | |
| 4,050 | | | 15.2(2) |
| 4,860 | | 8.6(2) | |
| 5,880 | | 7.7(4) | |

[1] Uniform.
[2] Average (gradient).

NOTE.—The sulfation values in the above table are average results for more than one cycle, with one exception. The number of cycles averaged is shown in parentheses.

Comparison of Run C with Run B shows a higher degree of copper oxide sulfation in Run C, even though the average copper concentration, and therefore the total amount of copper in the bed, was about the same in both runs. The sorbent bed in Run C had a gradient copper concentration decreasing from inlet to outlet, while the sorbent bed in Run B had a uniform copper concentration. Sulfations in Run A were lower than those in Run C over the entire range of space velocities tested, and were lower than those in Run B over most of the range of space velocities tested. The degree of sulfation has been found in other runs not to be significantly affected by the sulfur dioxide inlet concentration, so that the different results in Runs B and C cannot be explained on the basis of the different $SO_2$ inlet concentrations.

What is claimed is:

1. In a process for the removal of sulfur dioxide from a gas containing sulfur dioxide and oxygen by contacting said gas with a fixed bed of a solid sorbent composition in the form of particles comprising an active material for the selectve removal of sulfur dioxide from gas mixtures deposited on a porous support, the improvement wherein the concentration of said active material in said particles diminishes from the inlet end to the exit end of the bed in the direction of flow of said gas containing sulfur dioxide and oxygen, the concentration of active material in particles at the inlet end being greater by at least 2% by weight, based on total sorbent weight, than the concentration of active material in particles at the exit end of the bed.

2. A process according to claim 1 in which said bed of solid sorbent comprises a plurality of sections arranged in series in the direction of gas flow, the concentration of active material within each section being substantially uniform and each section except the first having a lower concentration of active material than the preceding section, the active material concentration in said first section being greater by at least 2% by weight, based on total sorbent weight, than the active material concentration in the section nearest the exit end of the bed.

3. A process according to claim 1, in which said active material is copper oxide.

4. A process according to claim 1 in which the inlet temperature of said flue gas is in the range of about 600° to about 900° F.

5. A process according to claim 2 in which said active material is copper oxide and said support is alumina.

6. A process according to claim 2 in which the concentration of active material in each section except the first is less by at least 1% by weight, based on total sorbent weight, than the concentration of active material in the preceding section.

7. A process according to claim 2 in which the sulfur dioxide-containing gas flows downwardly through said bed and in which the sorbent bed section having the greatest concentration of active material is the section nearest the top of the bed.

8. A process according to claim 2 in which the particles in each bed section except the first are surface impregnated whereby the active material is deposited predominantly in the outer portions of said particles adjacent to the outer surfaces thereof.

References Cited

UNITED STATES PATENTS

| 3,634,028 | 1/1972 | Hohnp | 423—244 X |
| 3,411,865 | 11/1968 | Pijpers et al. | 423—244 |

FOREIGN PATENTS

| 1,160,662 | 8/1969 | Great Britain | 423—244 |

OSCAR R. VERTIZ, Primary Examiner

G. A. HELLER, Assistant Examiner